Oct. 13, 1936.                J. SLAVINS                2,057,542
                              BATTERY CLAMP
                           Filed Dec. 4, 1935

*John Slavins*
INVENTOR.

Patented Oct. 13, 1936

2,057,542

UNITED STATES PATENT OFFICE 2,057,542

BATTERY CLAMP

John Slavins, Youngstown, Ohio

Application December 4, 1935, Serial No. 52,793

2 Claims. (Cl. 173—259)

This invention relates to battery terminal clamps.

The principal object of this invention is to provide a battery terminal clamp and means for loosening and tightening said battery terminal clamp.

A further object is to provide a rotatable bolt which is positioned in the outer unthreaded ends of said battery terminal clamp.

A still further object is to provide two nuts threaded upon the rotatable bolt, one nut being positioned between the end portions of the clamp and the other nut being positioned in a recess formed on the outer side of one of the extended end portions.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawing, wherein:—

Figure 1:
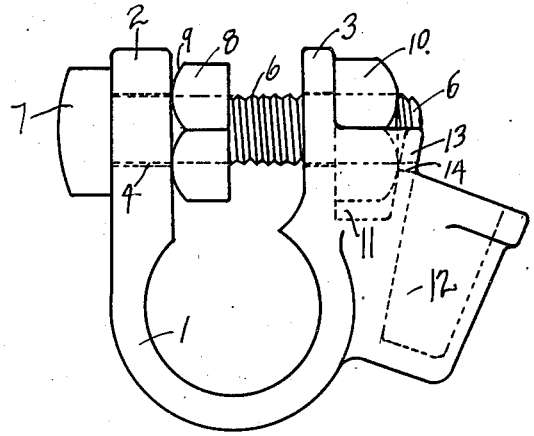
Figure 1 is a top plan view of the battery terminal clamp.
Figure 2:
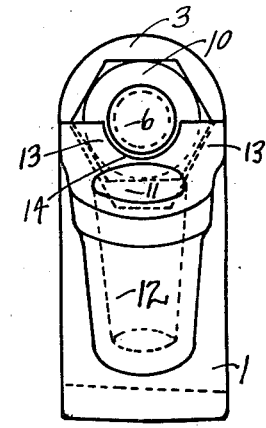
Figure 2 is a side elevation of the clamp.
Figure 3:
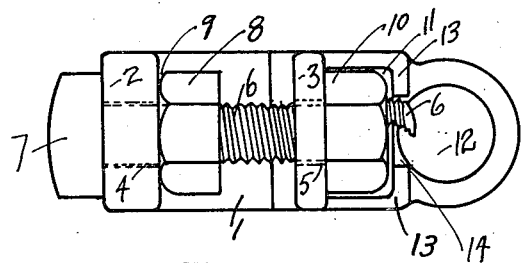
Figure 3 is an end view of the clamp.

By referring to the drawing it will be seen that there is provided a clamp 1, this clamp 1 is provided with oppositely disposed end portions 2 and 3, these oppositely disposed end portions 2 and 3 are provided with unthreaded openings 4 and 5 in which a threaded bolt 6 is positioned. A head 7 of the threaded bolt 6 is positioned on the outer side of the extended end portion 2. A threaded nut 8 is also positioned upon the threaded bolt 6, the nut 8 being positioned with its beveled surface 9 against the inner side of the extended end portion 2.

The threaded bolt 6 is also provided with a threaded nut 10 which is positioned partially within a recess 11 formed on the outer side of the extended end portion 3. A socket 12, adapted to receive a battery cable, is also positioned on this outer side of the extended end portion 3. The recess 11 and the socket 12 being so formed as to provide a partition 13, this partition 13 has a depression 14 to allow the free passage of the bolt 6.

In operating this battery terminal clamp the operator will turn the head 7 of the bolt 6, thus causing the nut 10 to travel inwardly on the bolt 6, the nut 10 will cause the extended end portion 3 to move inwardly because the nut 10 is held non-rotatable in the recess 11. This action will partially bring together the extended end portions 2 and 3 of the clamp 1. By reversing this action the extended end portions 2 and 3 will be forced apart due to the action of the nut 10 against the partition 13 in connection with the action of the nut 8 against the inner side of the extended end portion 2. This nut 8 will rotate with the bolt 6 due to the lack of friction of its beveled surface 9 against the extended end portion 2. It will be seen that I have provided an inexpensive battery terminal clamp that is positive in operation. I have provided a clamp in which the bolt and nuts may be easily replaced at any time. I have provided a clamp that can be operated successfully despite any corrosion that may take place, due to the fact that the bolt is not threaded into the clamp.

What I claim is:

1. In a device of the class described comprising a clamp with oppositely disposed end portions, a recess formed on the outer side of one of the end portions, unthreaded openings in the oppositely disposed end portions, a threaded bolt located in the unthreaded openings, a nut positioned on the outer end of the threaded bolt, said nut being positioned partially within said recess for the purpose of preventing rotation of said nut, a beveled surface nut positioned on said bolt between the oppositely disposed end portions, a socket formed in connection with the recess on the outer side of one of the end portions, said socket adapted to receive a battery cable, said recess and socket so formed as to provide a partition between said recess and socket.

2. In a battery clamp comprising extended end portions on said clamp with unthreaded openings in said end portions, a recess formed on an outer side of said clamp adapted to receive a nut and hold the same against rotation, a socket for a battery cable formed in connection with said recess, a threaded bolt located in said unthreaded openings, a threaded nut positioned on said bolt between the extended end portions, a threaded nut positioned on said bolt and resting within said recess, a partition formed on said recess to separate said recess from said socket, and for the purpose of holding the said nut in said recess.

JOHN SLAVINS.